United States Patent Office
2,748,088
Patented May 29, 1956

2,748,088

PROCESS FOR INHIBITING FOAM

Louis T. Monson, Puente, Calif., assignor to Petrolite Corporation, a corporation of Delaware No Drawing. Application December 18, 1951, Serial No. 262,325

9 Claims. (Cl. 252—321)

Foams occur as undesirable, incidental features in many industrial processes. The theory of their formation is not highly developed; so that hypotheses on which foam reduction or destruction processes might be based are difficult to formulate. As a consequence, foam-destroying agents are usually devised for use in the case of particular foams.

I have discovered a novel process of reducing or destroying foams and of preventing their formation, which appears to be relatively general in applicability, in that it may be used on compositions comprising aqueous materials or solutions; on compositions comprising non-aqueous materials, such as hydrocarbon liquids; and on compositions comprising mixtures of aqueous and non-aqueous media. My process consists in subjecting a foaming or potentially-foaming composition to the action of a small proportion of a reagent or anti-foamer of the kind subsequently described, thereby causing the foaming properties of the liquid to be diminished, suppressed or destroyed. In applying my process to the reduction or destruction of a foam, the reagent may be poured or sprayed or dripped into the body of foam on top the liquid, as desired; and the foam breaks and is destroyed or reduced, substantially at once, as a consequence of such addition of said reagent. Adding the reagent to the liquid underlying such already-formed foam is also practicable. In applying my process to the prevention of foaming, the reagent is admixed, in some small proportion, with a potentially-foaming liquid, by any desired or suitable procedure. The ability of the system to foam is destroyed or at least materially reduced by such addition of said reagent.

I have discovered that when a terpene alcohol is oxyalkylated using alkylene oxides selected from the class consisting of ethylene oxide, propylene oxide, butylene oxide, glycid, and methylglycid, the oxyalkylated product usually exhibits foam-inhibiting properties which are markedly superior to those of the parent terpene alcohol.

The terpene alcohols occur principally in pine oil, an extract from pine wood. Pine oil consists largely of alpha-terpineol, with lesser proportions of such compounds as beta-terpineol, fenchyl alcohol, borneol, other tertiary alcohols, etc. It is usually used as such mixture; but its various important constituents are sometimes separated, by distillation or otherwise. For example, alpha-terpineol is available in large volume on the open market.

For reasons of cost, I ordinarily prefer to employ an oxyalkylated pine oil; but my invention includes the oxyalkylated derivatives of the oxyalkylation-susceptible constituents of pine oil, taken individually.

Pine oil has long been used as an anti-foamer in a variety of applications. I have discovered that the anti-foaming characteristics of pine oil, and of its individual constituents, such as alpha-terpineol, are usually materially enhanced by oxyalkylation.

Oxyalkylation is a conventionally employed process today, and need not be described in detail. It is sufficient to say that if a compound contains a hydrogen atom attached to oxygen, nitrogen, or sulfur, it is ordinarily susceptible to reaction with an alkylene oxide of the foregoing class. In oxyalkylation, the oxide is absorbed and appears as one or more oxyalkylene groups between the labile hydrogen atom and the oxygen, nitrogen, or sulfur atom to which said hydrogen atom was originally attached. Long oxyalkylene group chains are therefore readily introducable into oxyalkylation-susceptible compounds in this manner. The oxyalkylation process is facilitated by the presence of an alkaline catalyst, but where the initial reactant is basic the catalyst's importance is minimized. Many oxyalkylations are possible to achieve under such circumstances without any catalyst being present.

U. S. Patent No. 2,499,365, dated March 7, 1950, to De Groote and Keiser, gives an exhaustive statement of oxyalkylation, its reactants, and procedures. While the oxyalkylation-susceptible reactants there were synthetic resins, the statements are broadly relevant here, and reference is made to them.

Oxyalkylations may be conducted at quite different temperatures. The lower temperature limit, of course, is the temperature which just barely sustains reaction and absorption of the alkylene oxide. Higher temperatures produce greater reaction rates, until dangerously rapid, exothermic reactions are observed, especially with a reactant like glycid. Ordinarily, there is no appreciable difference in oxyalkylated product when different temperatures are employed in the oxyalkylation. I have found, however, that sometimes it is definitely desirable to conduct the oxyalkylation step at a lower temperature and for a longer time than at a higher temperature for a shorter time. More rarely, the opposite holds true. All such variations lie within the scope of my invention.

If the starting material is acidic, it is of course necessary first to neutralize such acidity and then to add an extra proportion of alkali to supply the alkalinity for catalysis.

I particularly prefer to employ propylene oxide in the oxyalkylation of pine oil and the terpene alcohols, and, more especially, to the extent that at least one-half of the oxyalkylated molecule, by weight, consists of a multiple of the oxypropylene group, $OC_3H_6$.

I have further discovered that the anti-foaming characteristics of the oxypropylated terpene alcohols are sometimes further enhanced if, in addition to oxypropylene groups, the oxyethylated molecule also contains oxyalkylene groups derived from one or more of the above-recited alkylene oxides. My generally preferred reagents contain both oxypropylene groups and oxyethylene groups, in addition to a terpene alcohol residue. My most preferred reagents include oxypropylene groups to the extent of at least one-half by weight of the molecule, as well as some oxyethylene groups.

The oxypropylation reaction is usually not as readily achieved as is oxyethylation. Oxypropylation usually requires a higher temperature if it is to be accomplished in the same time; or, conversely, at a given temperature, oxypropylation requires a longer time than oxyethylation. Oxyalkylation procedures are so well known that it is unnecessary to do more than state that oxyalkylation is conducted by conventional procedures, to produce the reagents of the present process.

My process is therefore one for inhibiting foam, characterized by subjecting a foaming composition to the action of an oxyalkylated terpene alcohol, the alkylene radicals of the oxyalkylene groups being selected from the class consisting of ethylene, propylene, butylene, hydroxypropylene, and hydroxybutylene radicals.

As examples of my reagents, the following may be recited:

*Example 1*

Introduce 150 grams of commercial pine oil into a conventional autoclave, and add 2.5 ml. of 50% sodium hydroxide solution. Heat with stirring until the water of solution has been evolved; then purged with nitrogen, seal, and begin the introduction of propylene oxide at a temperature of about 110–120° C. The pressure should be maintained at about 20 p. s. i. g. or less. A total of 150 grams of propylene oxide is so introduced. The product is an effective anti-foamer.

*Example 2*

Proceed as in Example 1 above, but introduce a total of 500 grams of propylene oxide.

*Example 3*

Repeat Example 1 but introduce a total of 1,000 grams of propylene oxide.

*Example 4*

Repeat Example 1 but introduce a total of 1,500 grams of propylene oxide.

*Example 5*

Into the product of Example 2 above, while still in the autoclave, introduce 50 grams of ethylene oxide, at a temperature of about 160–170° C. and a pressure not exceeding about 50 p. s. i. g.

*Example 6*

Into the product of Example 3 above, while still in the autoclave, introduce 200 grams of ethylene oxide, using the conditions recited in Example 5 above.

*Example 7*

Into the product of Example 3 above, while still in the autoclave, introduce 400 grams of ethylene oxide, using the conditions recited in Example 5 above.

*Example 8*

Into the product of Example 4 above, while still in the autoclave, introduce 200 grams of ethylene oxide, using the conditions of Example 5 above.

*Example 9*

Into the product of Example 4 above, while still in the autoclave, introduce 400 grams of ethylene oxide, using the conditions of Example 5 above.

*Example 10*

Repeat Examples 5 to 9 above, as to amounts of pine oil, propylene oxide, and ethylene oxide, and reaction conditions, but introduce the ethylene oxide first, and the propylene oxide last.

*Example 11*

Repeat Example 1 but introduce a total of 1,160 grams of propylene oxide. Follow this by introducing a total of 2,640 grams of ethylene oxide, by the procedure recited in Example 5.

*Example 12*

Substitute alpha-terpineol for pine oil in Examples 1–11 above.

*Example 13*

Substitute beta-terpineol for pine oil in Examples 1–11 above.

*Example 14*

Substitute borneol for pine oil in Examples 1–11 above.

*Example 15*

Substitute fenchyl alcohol for pine oil in Examples 1–11 above.

Where more than one alkylene oxide is employed, they may be introduced sequentially or simultaneously, as desired. I prefer to employ propylene oxide and ethylene oxide, where two of the oxides are to be employed. I prefer to introduce the propylene oxide first and the ethylene oxide subsequently, in such instances.

The product of Example 9 may be taken as my preferred material.

It will be obvious from the foregoing examples, that the terpene alcohol may contribute less than 10% or even less than 5% of the final oxyalkylated molecule. I believe that the finished product should contain at least about 2% of the terpene alcohol residue.

My present class of oxyalkylated resinous derivatives may be used alone in foam inhibition, or they may be used in admixture with any other effective and compatible anti-foamer, e. g., with the reagents described and claimed in my U. S. Patent No. 2,408,527, dated October 1, 1946, those described and claimed in my co-pending application, Serial No. 775,145, filed September 19, 1947, now Patent 2,622,070, granted December 16, 1952, or those described and claimed in my co-pending application, Serial No. 180,691, filed August 21, 1950, now Patent 2,622,069, granted December 16, 1952.

It is usually convenient to dilute my reagents during manufacture or before use with some suitable solvent. Solvents generally suitable for incorporation into my reagent include: water; petroleum hydrocarbons, like gasoline, kerosene, stove oil, aromatic solvent; coal tar products, such as benzene, toluene, xylene, tar acid oil, cresol, anthracene oil; alcohols, particularly aliphatic alcohols like methyl, ethyl, isopropyl, butyl, hexyl, octyl, etc. Miscellaneous solvents, such as pine oil, carbon tetrachloride, etc., may be employed. Sometimes other factors such as whether it imparts an objectionable odor to the defoamed composition or to the products into which it finds its way will determine the choice of solvent. In general, the amounts of finished anti-foamer reagent employed are so small that considerable tolerance of undesirable properties in a solvent exists.

The mixture of active ingredients and solvents is stirred until homogeneous. I prefer to employ a petroleum distillate in the proportion of 25 to 50% of the finished product, by volume, although water is an excellent solvent in some instances.

I desire to point out that the superiority of the reagent contemplated in my process is based upon its ability to reduce or destroy foam, or to prevent foam formation, in certain foaming or potentially foaming compositions more advantageously and at lower cost than is possible with other reagents or processes. In certain instances, it has been found to destroy or reduce foams or prevent their formation, which foams were not economically or effectively reducible or preventable by any other known means.

My reagents are useful in controlling foams in many different types of system, aqueous and non-aqueous. They will control foams encountered in the manufacture of alkaline hypochlorite bleaches. They are effective in controlling foam in petroleum refining operations. They are effective in inhibiting foam in a gas-treating system, in which a mixture of glycols and alkanolamines is used to dehydrate and purify natural gas.

I have applied my reagents to the control of foam in protein adhesives solutions, such as casein and soybean adhesives, as used in the plywood industry. Latex adhesives, printing inks, aqueous emulsion paints, all produce foams which are amenable to my reagents.

In the foregoing description, I have made it clear that my reagents may be used to reduce, destroy, or prevent foam. In the appended claims I have used the word "inhibit" to include all these corrective and preventive aspects of my process and reagents.

The procedures employed in practising my process are numerous. The following description will illustrate several techniques commonly employed. It should be understood that the claims are not limited to the procedures described; and that my process consists broadly in bringing into contact by any suitable means my reagent and the foam or the potentially foaming composition.

In controlling foam in a glycol-amine gas treating plant handling natural gas, the glycol-amine mixture had a volume of about 2,000 gallons and make-up was about 2,000 gallons a month. My preferred reagent was injected into the liquid mixture in the return line from the stripping operation, by means of an electrically-powered proportioning pump of conventional design. The feed rate was less than 1 quart daily. Foam difficulties in the system were satisfactorily controlled by this procedure.

In sewage plants, for example, in activated-sludge-process plants, foam is frequently a serious problem in aeration basins and elsewhere. In one such plant, I have demonstrated that my reagent will control foam when sprayed into the head of foam, or when sprayed into or simply poured into the liquid in such basin. The foam-inhibiting effect appears to persist quite satisfactorily.

Determination of the optimum or minimum amount of my foam-inhibiting reagent to be used in any application may be accomplished in different ways. Small portions of the potentially foaming liquid may be filled into test bottles, different small proportions of my reagent added, and the chemicalized samples shaken for a short time. Simple observation of the relative speed and completeness of foam destruction should permit selection of the best reagent proportion to be applied on the large scale. The easiest way to determine the amount of my reagent required is to introduce it into the foaming or potentially foaming liquid in a fairly large proportion, e. g., 1%, and then to reduce the reagent feed rate until foam destruction is just being accomplished satisfactorily. Usually foam destruction is directly proportional to the amount of reagent used, at least up to about 1% of reagent. In a few instances, it may be found that using more or less reagent than an optimum proportion will give inferior results.

If the proportions of reagent to be employed in the above test are very small, it may be desirable to determine the optimum proportions of foaming composition and anti-foamer by introducing the latter into the sample of foaming liquid in the form of a solution in a suitable solvent.

Throughout this specification, I have shown that my process is equally applicable to systems in which a foam is already in existence and to systems which are potentially foaming compositions, in that they have the property of producing foams when agitated or mixed with air or some other suitable gas. Destruction, reduction and prevention are substantially equivalent actions. It is impossible to determine whether the reagent does in fact prevent the formation of the initial laminae of foam or whether such initial laminae are destroyed by the reagent before subsequent laminae of sufficient stability to produce a foam can be superimposed thereon. By "foaming composition" in the appended claims, I mean a composition which is either actually foaming or which is capable of producing a foam under suitable conditions, e. g., by simply passing air through it.

In most instances, my reagent is effective to the extent that it destroys an existing foam substantially completely. In some instances, as when too little reagent is used, foam reduction may be slow or even incomplete. I intend that this description and my invention relate both to complete destruction and to partial destruction of foams.

The proportions of my reagent required to be employed appear to vary widely. However, I wish to limit my invention to the use of my reagent in amounts 1% or less of the foaming composition. Usually, the amounts required will be between 0.1% and 0.0001%.

I have stated above that my present reagents may be used in conjunction with any other effective and compatible anti-foamer. It should also be stated that they are useful in conjunction with foam-inhibiting processes which are mechanical or electrical in character, rather than chemical. For example, some foams may be effectively destroyed by water sprays or jets. Incorporation of a small proportion of my reagents into such water sprays increases their effectiveness. U. S. Patent No. 2,240,495, to Dillon et al., dated May 6, 1941, relates to a process for resolving foam by means of a high electrical potential. Incorporation of a small proportion of my present reagents into the foaming liquid increases the effectiveness of such electrical processes.

I claim:

1. A process for inhibiting foam, characterized by subjecting a non-detersive foaming composition to the action of not more than 1% of an oxyalkylated terpene alcohol, the alkylene radicals of the oxyalkylene groups being selected from the class consisting of propylene and mixtures of ethylene and propylene radicals.

2. The process as in claim 1 wherein at least one-half by weight of the oxyalkylated terpene alcohol consists of a multiple of the divalent oxypropylene group, $OC_3H_6$.

3. The process as in claim 1 wherein the terpene alcohol is both oxyethylated and oxypropylated.

4. A process for inhibiting foam, characterized by subjecting a non-detersive foaming composition to the action of not more than 1 per cent of an oxyethylated and oxypropylated terpene alcohol, wherein at least one-half by weight of the oxyalkylated terpene alcohol consists of a multiple of the oxypropylene group, $OC_3H_6$.

5. The process of claim 4, wherein the terpene alcohol is alpha-terpineol.

6. The process of claim 4, wherein the terpene alcohol is beta-terpineol.

7. The process of claim 4, wherein the terpene alcohol is borneol.

8. The process of claim 4, wherein the terpene alcohol is fenchyl alcohol.

9. The process of claim 4, wherein the terpene alcohol is pine oil.

References Cited in the file of this patent

UNITED STATES PATENTS 2,549,435  De Groote et al. _____ Apr. 17, 1951

FOREIGN PATENTS 717,078  Germany _____ Feb. 5, 1942